United States Patent
Hartrey

(10) Patent No.: US 7,228,249 B2
(45) Date of Patent: Jun. 5, 2007

(54) METHODS AND APPARATUS FOR DETERMINING THE CONDITION OF A SENSOR AND IDENTIFYING THE FAILURE THEREOF

(75) Inventor: Timothy John Hartrey, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 164 days.

(21) Appl. No.: 10/299,293

(22) Filed: Nov. 19, 2002

(65) Prior Publication Data

US 2004/0098228 A1    May 20, 2004

(51) Int. Cl.
*G06F 17/00* (2006.01)

(52) U.S. Cl. .................. 702/116; 702/94; 702/104; 702/107; 702/150; 701/34

(58) Field of Classification Search ............... 702/116, 702/33–35, 57, 58, 94, 64, 65, 81, 150, 151, 702/182–183, 185, 189, 104, 107; 701/34; 123/376–377
See application file for complete search history.

(56) References Cited

U.S. PATENT DOCUMENTS

| | | | | | |
|---|---|---|---|---|---|
| 4,105,900 A | * | 8/1978 | Martin et al. ............... 327/526 |
| 4,337,516 A | * | 6/1982 | Murphy et al. ............ 702/183 |
| 4,752,733 A | * | 6/1988 | Petr et al. .................... 324/225 |
| 5,025,259 A | * | 6/1991 | Abe ........................... 341/118 |
| 5,235,527 A | * | 8/1993 | Ogawa et al. .............. 702/116 |
| 5,235,951 A | * | 8/1993 | Taguchi et al. ............ 123/397 |
| 5,329,914 A | * | 7/1994 | Togai et al. ................ 123/688 |
| 5,394,341 A | * | 2/1995 | Kepner ....................... 702/183 |
| 5,479,161 A | * | 12/1995 | Keyes et al. ........... 340/870.04 |
| 5,602,732 A | * | 2/1997 | Nichols et al. ............... 701/29 |
| 5,625,557 A | * | 4/1997 | Colosky ...................... 701/35 |
| 5,669,353 A | * | 9/1997 | Shirai et al. ................ 123/399 |
| 5,673,668 A | * | 10/1997 | Pallett et al. ............... 123/436 |
| 5,680,409 A | * | 10/1997 | Qin et al. .................... 714/799 |
| 5,754,963 A | * | 5/1998 | Nunneley et al. ............. 701/34 |
| 5,761,090 A | * | 6/1998 | Gross et al. .................. 714/26 |
| 6,098,011 A | * | 8/2000 | Scott ........................... 701/100 |
| 6,276,332 B1 | * | 8/2001 | Storhok et al. ............. 123/397 |
| 6,414,607 B1 | * | 7/2002 | Gonring et al. ............... 341/20 |
| 6,463,797 B2 | * | 10/2002 | Lippa ........................ 73/118.2 |
| 6,468,476 B1 | * | 10/2002 | Friend et al. .............. 422/68.1 |
| 6,625,527 B1 | * | 9/2003 | Ding et al. ................... 701/34 |
| 6,658,333 B2 | * | 12/2003 | Kawada et al. ............... 701/41 |
| 6,698,398 B2 | * | 3/2004 | Bauerle ...................... 123/399 |
| 2002/0082587 A1 | * | 6/2002 | Noda .......................... 604/544 |
| 2003/0236610 A1 | * | 12/2003 | Cullen et al. ............... 701/103 |

FOREIGN PATENT DOCUMENTS

DE    10242128 A1 *  3/2004

* cited by examiner

*Primary Examiner*—Jeffrey R West
(74) *Attorney, Agent, or Firm*—Christopher DeVries

(57) ABSTRACT

Methods and apparatus are provided which generate an error signal if a sensor is either anticipated to fail or fails. At least two sensors provide input signals having magnitudes that approximately correspond to a sensed event. A processor calculates an actual correlation error for the two signals. A processor then further calculates an estimated new correlation value based on the difference of a stored initial correlation value and the actual correlation error. After a predetermined number of estimated correlation values are calculated, the error signal is generated if the difference between an estimated correlation value and the actual correlation error exceeds a predetermined threshold.

18 Claims, 5 Drawing Sheets

METHODS AND APPARATUS FOR DETERMINING THE CONDITION OF A SENSOR AND IDENTIFYING THE FAILURE THEREOF

TECHNICAL FIELD

The present invention generally relates to monitoring and recording the conditions of the sensors of a control system, and more particularly to methods and apparatus for anticipating and identifying the failure of any of such sensors.

BACKGROUND OF THE INVENTION

Many kinds of mechanical equipment utilize electrical sensors to provide signals for measuring parameters or identifying physical events. More particularly, modern internal combustion engines utilize Electronic Throttle Control (ETC) to adjust the fuel injectors, the engine spark and the amount of airflow through an intake manifold to an intake port of the engine in response to sensor monitored operator variations of the throttle. Such ETC systems provide advantages such as reduced costs, improved simplicity, engine noise reduction, throttle command conditioning for emissions reduction, and/or torque based control functions.

Operator adjustment of the throttle or accelerator is typically accomplished through the use of an accelerator input mechanism, such as a foot pedal, joystick, hand pedal, lever or track ball. The input mechanism is mechanically coupled to sensors that in turn provide control signals having magnitudes indicative of the accelerator position to an ETC microprocessor. In response, the microprocessor generates additional electrical control signals for enabling the hardware of the vehicle engine to provide the operating level indicated by the accelerator.

Multiple input sensors are utilized to sense a particular parameter such as the amount of accelerator depression to improve sensing reliability. Redundancies in the accelerator sensors and associated hardware have become standard in ETC systems with the multiple sensors being processed to ensure secure pedal and throttle signals. Failure or deterioration of any of such sensors can possibly result in inconsistent or inaccurate throttle control. Thus, prior art ETC systems monitor the condition of the accelerator sensors so that corrective action can be taken if a sensor is failing or has failed. The corrective action can include the initiation of a "limp home" mode which results in a dash board warning light indication, reduced vehicle acceleration capability and an immediate trip to a repair facility.

"Correlation Error" is a function of the difference in the instantaneous magnitudes of the control signals from a pair of the foregoing sensors. Some prior art ETC systems monitor and store the correlation error of such sensors only when the accelerator pedal is released, for instance. Thus, a correlation error for these sensors is learned only at one accelerator position such as at idle when the throttle is closed. As a result, only the one correlation error value is monitored by such prior art systems to determine ETC accelerator pedal sensor reliability.

In view of the foregoing, it should be appreciated that it is desirable to provide methods and apparatus for improving the detection and notification that a sensor is failing or has failed. It is desirable to anticipate that a sensor is failing so that corrective action can be taken prior to the performance of the sensor degrading a predetermined amount that results in the previously mentioned undesirable "limp home" operation, for instance. In addition, it is desirable to provide methods and apparatus for learning sensor variations over time and for multiple input mechanism positions to allow the manufacturing tolerances for the sensing system to be less restrictive thus permitting a lower system cost. Furthermore, additional desirable features will become apparent to one skilled in the art from the foregoing background of the invention and the following detailed description of the preferred exemplary embodiments and the appended claims.

SUMMARY OF THE INVENTION

In accordance with the teachings of the present invention, methods and apparatus are provided for determining the condition of at least one of a plurality of sensors. An error signal is provided if there is an indication that any monitored sensor is either failing or has failed.

More particularly, control signals having different magnitudes that approximately correspond to a sensed event are provided by at least two of the sensors. A processor is configured to receive the control signals and to calculate and store an actual correlation error for the two signals. A memory stores a table of initial correlation values. A processor calculates the difference between the correlation value and a corresponding actual correlation error. The processor then calculates a new estimated correlation value based on the magnitude of the difference of the initial correlation value and the actual correlation error.

After a predetermined number of new estimated correlation values are calculated using the foregoing routine, the magnitude of the difference between the actual correlation error and a new correlation value is compared to a predetermined threshold. If the magnitude of the difference exceeds the threshold then the error signal is generated.

BRIEF DESCRIPTION OF THE DRAWINGS

The present invention will hereinafter be described in conjunction with the appended drawing figures, wherein like reference numbers denote like elements.

DESCRIPTION OF THE PREFERRED EMBODIMENT

The following detailed description of preferred exemplary embodiments of an apparatus and method of the invention is not intended to limit the scope or use of the invention.

Figure 1:
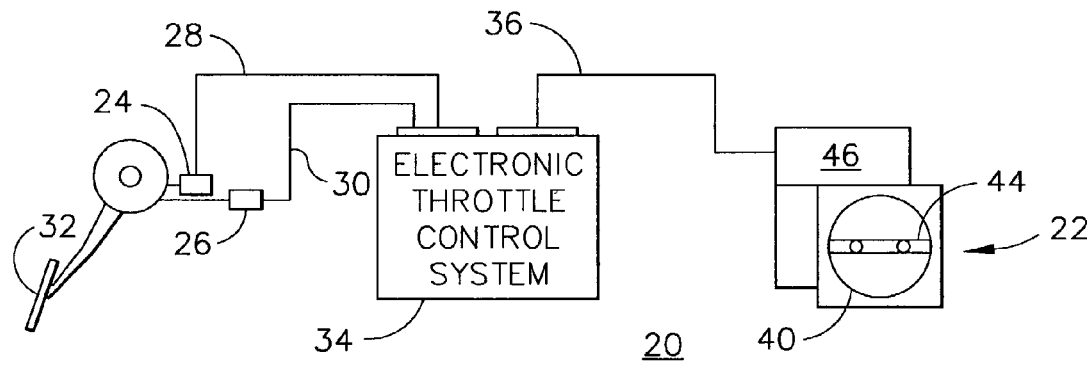
FIG. 1 is a simplified diagram of an automotive system having an Electronic Throttle Control system for adjusting the throttle of a vehicle engine.

Referring to FIG. 1, apparatus 20 is illustrated for adjusting throttle 22 of an internal combustion engine (not shown). Apparatus 20 is comprised of input mechanism position sensors 24 and 26 that are respectively configured to provide input signals on conductors or lines 28 and 30. The input signals have magnitudes that approximately correspond to a sensed physical event such as the desired operating level of the vehicle engine. The operating level is requested by an operator (not shown) who operates an input mechanism such as by depressing accelerator pedal 32, for instance.

Apparatus 20 is also comprised of an Electronic Throttle Control (ETC) system 34 for generating a throttle control signal on line 36 for throttle 22. Throttle 22 can have an electronically controlled intake valve such as a butterfly or rotary intake air valve 44, disposed within an intake bore 40. Valve 44 rotates in response to the throttle control signal to adjust the airflow rate through intake bore 40 to the engine. An electromechanical actuator 46, such as a Direct Current (DC) motor or a step motor, is mechanically linked to valve 44 by a rotatable shaft (not shown). The rotational position of the shaft and the corresponding flow rate of air to the engine are controlled through the variation of the throttle control signal on line 36 which is issued by ETC system 34.

Figure 2:
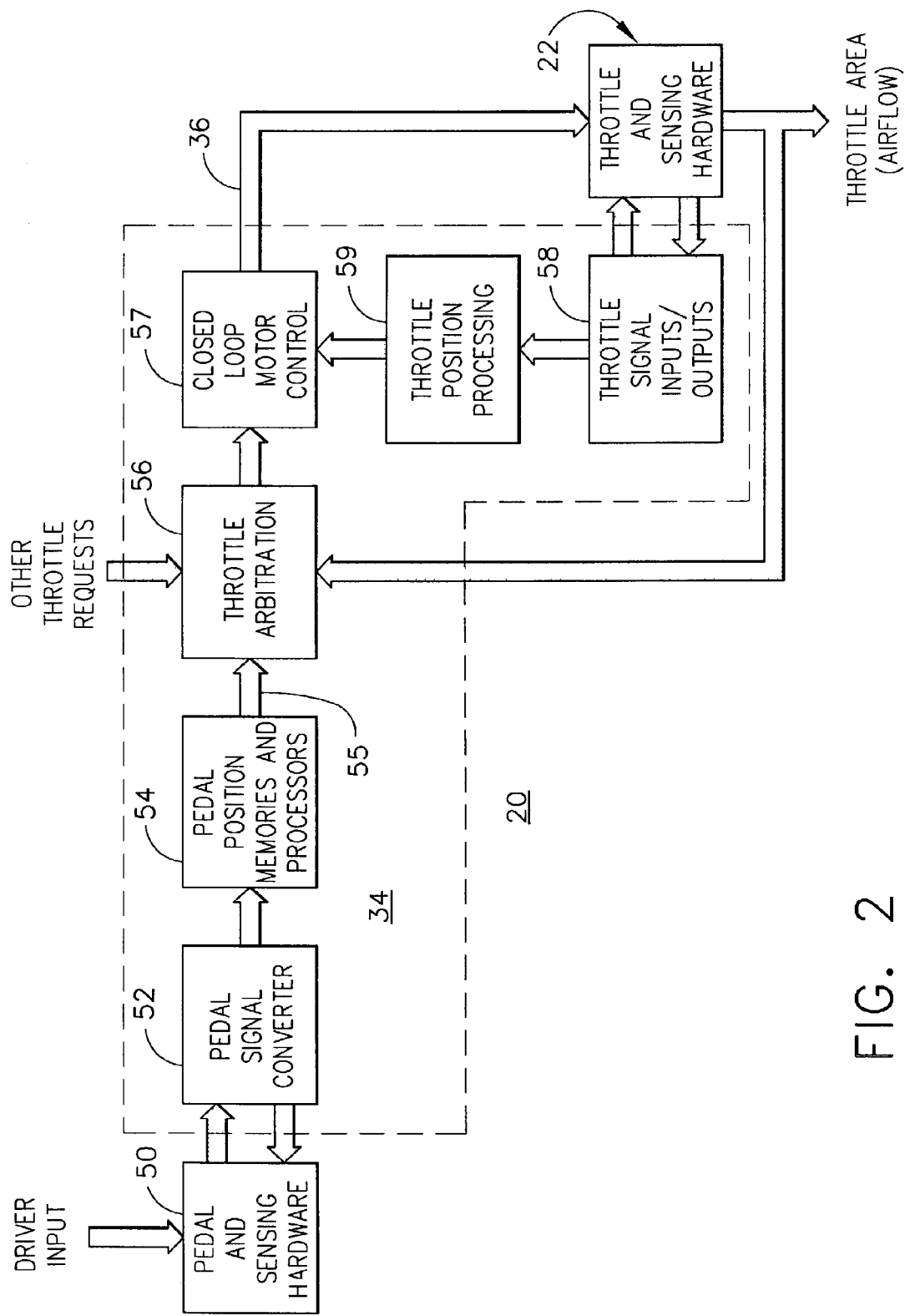
FIG. 2 is a block diagram of the Electronic Throttle Control system of FIG. 1 including an embodiment of the invention.

FIG. 2 shows a block diagram of ETC system 34 in accordance with an embodiment of the invention for anticipating and signaling the failure of either sensor 24 or sensor 26, for instance. Pedal and sensing hardware block 50 includes pedal 32 and sensors 24 and 26 of FIG. 1. Pedal signal converter 52 processes the analog signals from sensors 24 and 26 to provide a digital input signal to pedal position block 54 that can include several microprocessors and memories for performing a variety of functions. Block 54 is configured to generate an accelerator control signal that is applied through line 55 to throttle arbitration block 56 which processes such control signal along with other throttle control requests and provides an arbitrated throttle control signal to closed loop motor control block 57. Throttle 22 is coupled to motor control 57 by a feedback path including throttle signal block 58 and throttle position block 59. ETC system 34 employs a strategy of using redundant position sensors 24 and 26. The use of redundant sensors permits the detection of a failing or failed sensor by comparison of the output control signals of sensors 24 and 26 as will be subsequently described.

Figure 3:
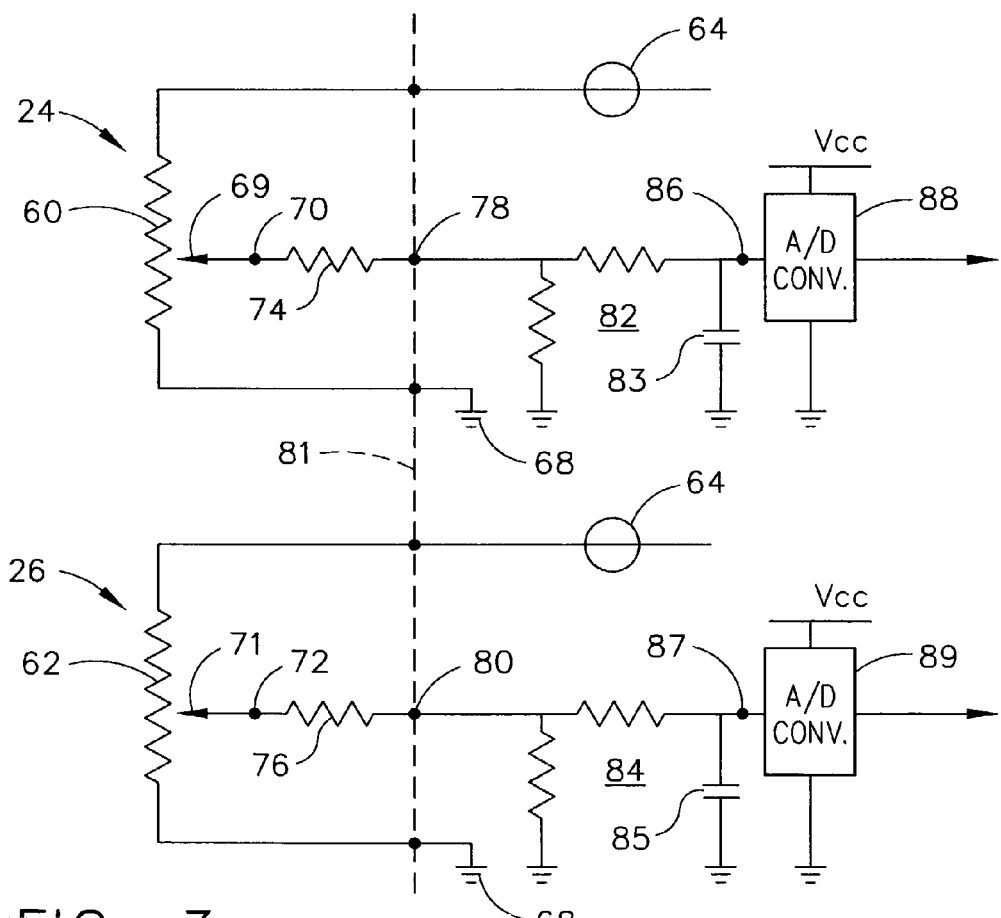
FIG. 3 is a circuit diagram of the pedal signal converter block of FIG. 2.

FIG. 3 shows input sensors 24 and 26 as being variable potentiometers having respective main resistive elements 60 and 62 each connected between 5 volt reference voltage supply 64 and ground 68. Elements 60 and 62 can be made of a resistive ink material having a mixture that is only approximately uniform in dimensions and resistivity. Potentiometer sliders 69 and 71 are mechanically coupled to pedal 32 so that they are moved together along elements 60 and 62 by movement of pedal 32. Sliders or movable members 69 and 71 have terminals 70 and 72 that are respectively connected through resistors 74 and 76 to output terminals 78 and 80. Sliders 69 and 71 are simultaneously operated or rotated as indicated by line 81 when pedal 32 is moved by the operator to provide voltages at output terminals 78 and 80 having magnitudes representative of the positions of accelerator pedal 32.

It is desired that the magnitudes of the voltages at terminals 70 and 72 are substantially equal to each other. However, because of manufacturing and material tolerances and normal wear and tear, the corresponding instantaneous resistances selected by members 69 and 71 differ from each other by at least a small amount even under normal operating conditions. This difference in resistance results in a proportional difference in the magnitudes of the direct current voltages at terminals 70 and 72. The "CORRELATION ERROR" of such resistances and such voltages can be expressed as a percentage. For instance, if terminal 70 has 2.6 volts when terminal 72 has 2.5 volts, then the 0.1 volt difference divided by 5 volts gives a correlation error of 2 percent (%). A correlation error between selected resistances above a predetermined magnitude and the corresponding output voltages at terminals 70 and 72 indicates that one of the sensors is either failing, has failed or that a noise signal has occurred on terminal 70 or 72, for instance. The signals at terminals 78 and 80 are filtered by respective filters 82 and 84 and stored on respective capacitors 83 and 85. The resulting filtered analog signals are applied to input terminals 86 and 87 of respective analog-to-digital converters 88 and 89. During normal operation, converters 88 and 89 provide digital input signals to one of the microprocessors of block 54 of FIG. 2 which averages these signals derived from the sensors to provide a signal on line 55 of FIG. 2 for processing within throttle arbitrator 56. As has been explained in more detail, input sensors 24 and 26 produce sensor output signals of changing magnitude as the operator alters the position of the input mechanism or device, such as accelerator pedal 32. Any of a number of input mechanisms can be used in accordance with the present invention, such as a foot pedal, hand pedal, joystick, lever or trackball. As can be appreciated by one of ordinary skill in the art, apparatus 20 for adjusting the throttle of the vehicle engine as previously described in this detailed description of the preferred embodiments provides numerous benefits.

Figure 4:
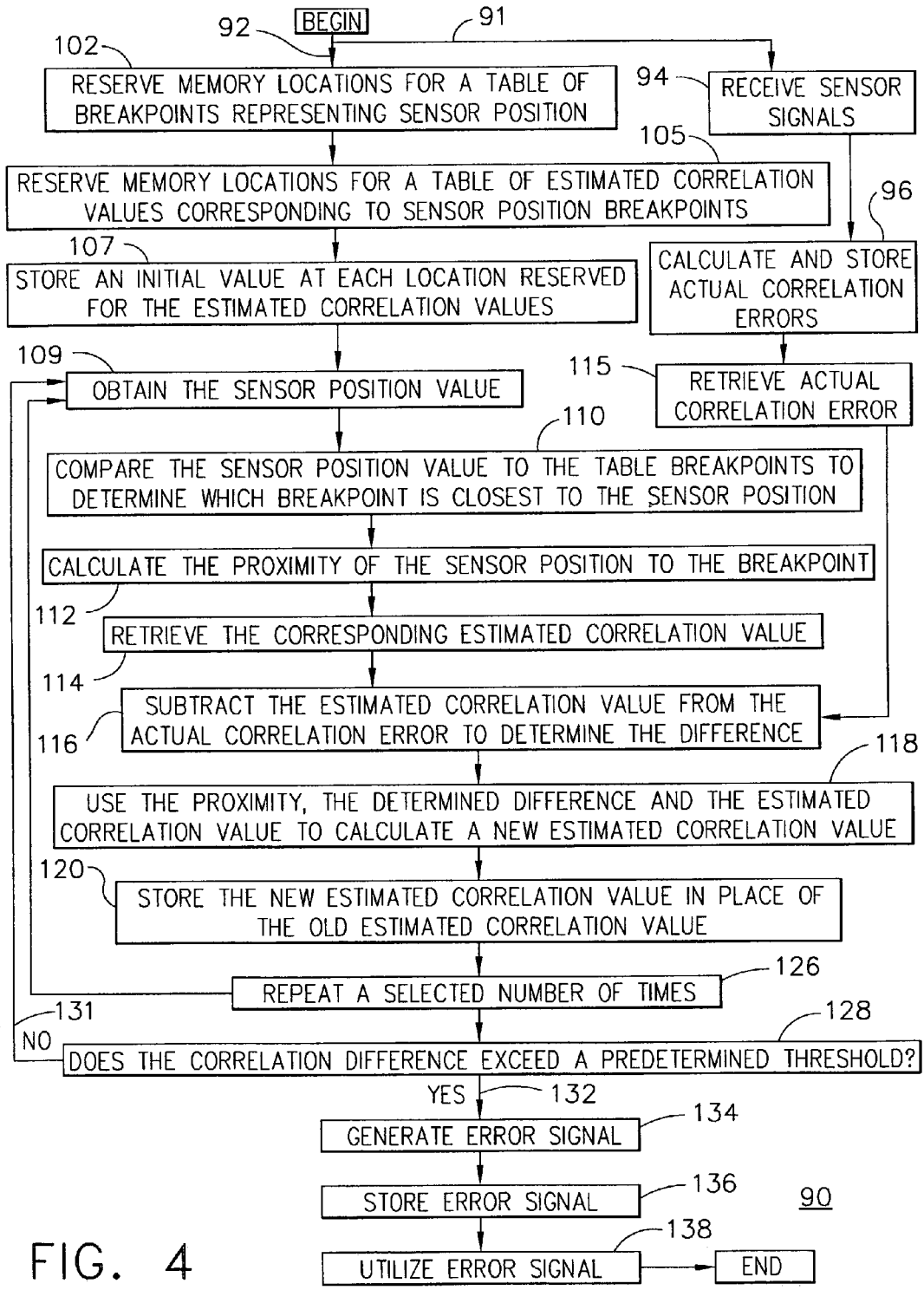
FIG. 4 is a flow chart of a method of another embodiment of the invention.
Figure 5:
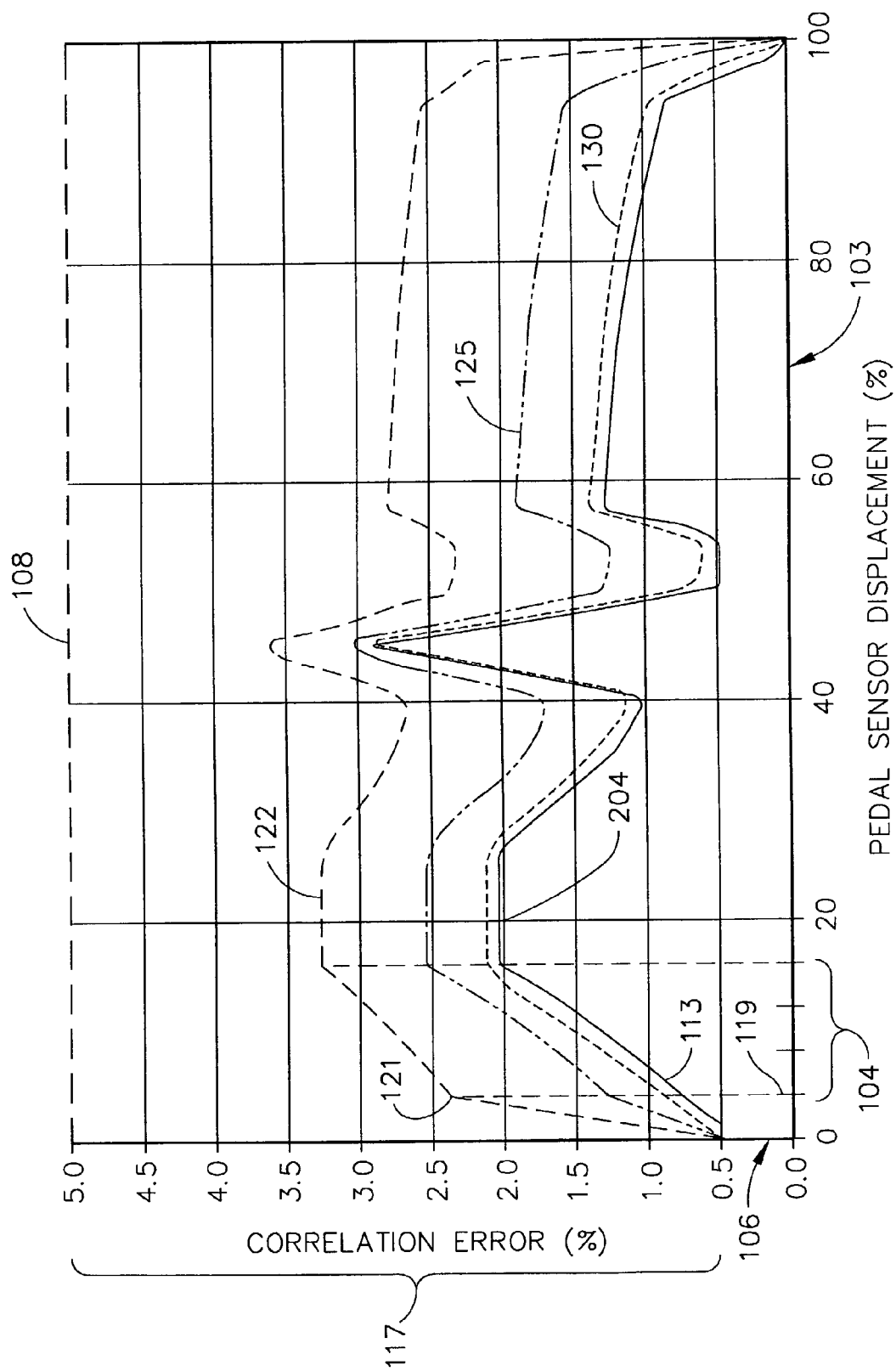
FIG. 5 shows graphs of correlation error vs. pedal sensor displacements for illustrating the method of FIG. 4.
Figure 6:
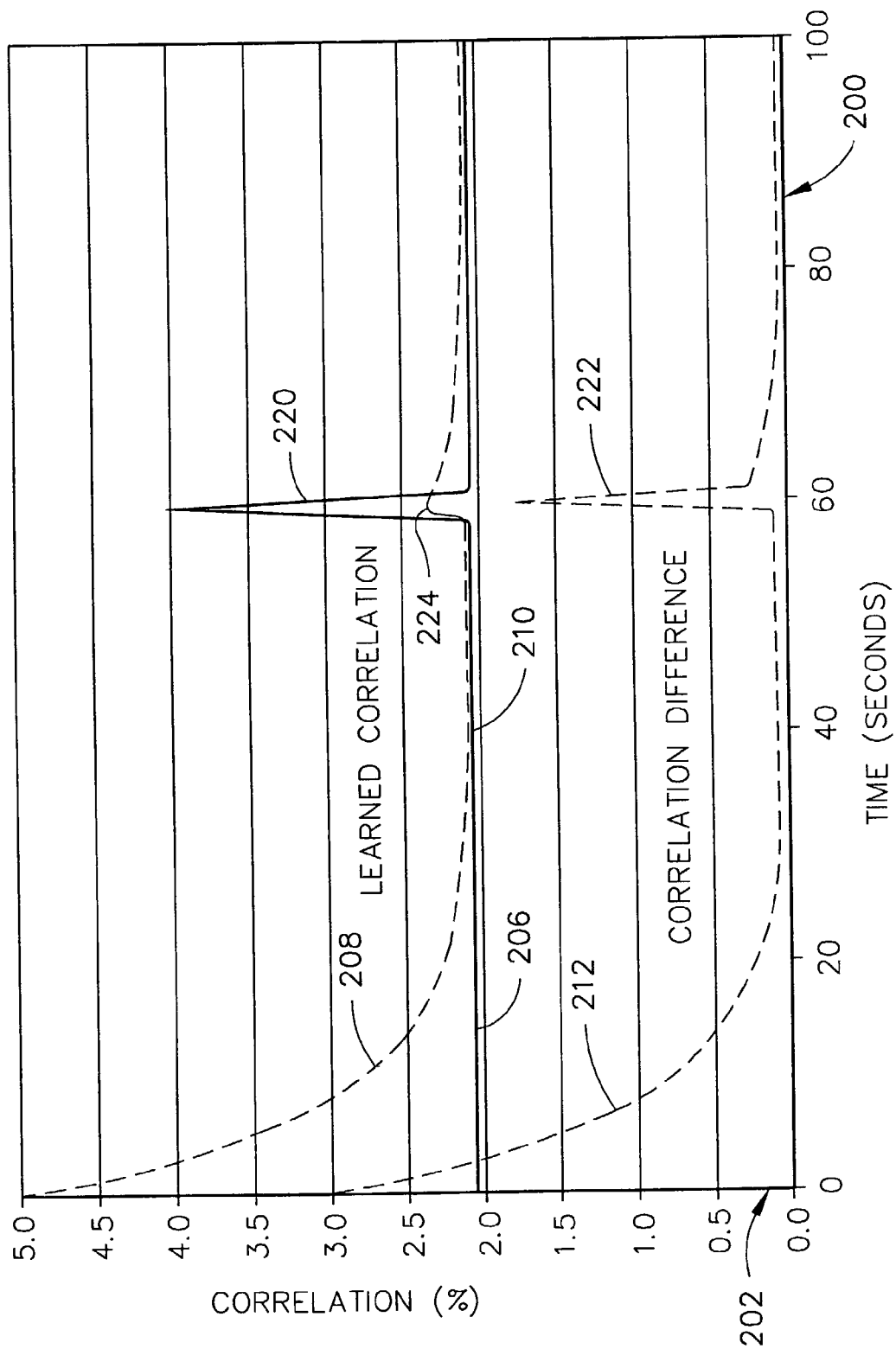
FIG. 6 shows graphs of correlation errors vs. time for further illustrating the method of FIG. 4.

Method 90 for monitoring the conditions of sensors 24 and 26, and anticipating and identifying sensor failure is illustrated in FIGS. 4, 5 and 6 according to a preferred exemplary method of the present invention. Method 90 can be effectuated by the apparatus 20 of FIGS. 1, 2 and 3. Specifically, pedal position processors and memories 54 of FIG. 2 are configured to perform the steps of method 90.

Method 90 employs an algorithm programmed into one or more of the microprocessors of block 54. Such processor(s) compute the ACTUAL CORRELATION ERROR of sensors 24 and 26 and ESTIMATED CORRELATION VALUES corresponding to various positions of pedal 32. The DIFFERENCES between the actual correlation errors and the estimated correlation values are used to accurately determine if a subsequent failure of sensor 24 and/or 26 is anticipated or has occurred. The algorithm uses a weighting scheme such that a measurement of sensor actual correlation error is not required to be made exactly at each of a plurality of table breakpoints. The algorithm also applies a delay or a filter to the process such that short duration errors are detected but not masked by an immediate update of a learned or estimated correlation value.

More specifically, method 90 of FIG. 4 starts with paths 91 and 92. Path 91 includes step 94 of retrieving the control signals from sensors 24 and 26 and calculating and storing the ACTUAL CORRELATION ERROR in step 96.

Path 92 includes step 102 of reserving locations in a memory included in block 54 for a table of BREAKPOINTS representing the physical positions of sensor sliders 69 and 71. The positions of sensor sliders 69 and 71 change with the displacement of accelerator pedal 32 which varies between 0% representing a closed throttle in response to a non-depressed pedal 32 and 100% representing an open throttle in response to a fully depressed pedal 32. The pedal sensor displacements are indicated as a percentage along abscissa axis 103 of FIG. 5. The BREAKPOINTS such as breakpoints 104 are preferably evenly spaced along axis 103. The accuracy of a stored waveform and the amount of required memory are proportional to the number of BREAKPOINTS. Memory locations are also reserved in step 105 of FIG. 4 for a table of ESTIMATED CORRELATION VALUES expressed as percentages and corresponding to the sensor position BREAKPOINTS reserved in step 102. The percentages for these ESTIMATED CORRELATION VALUES are indicated along ordinate axis 106 of FIG. 5.

Step 107 of method 90 of FIG. 4 is to store an initial maximum value at each memory location reserved in step 105 for the ESTIMATED CORRELATION VALUES. For example, the initial value of 5% is chosen to represent the worst case value. This initial value is represented by line 108 of FIG. 5 and corresponds to the maximum correlation error value specified by the ETC system requirements. Next, a SENSOR POSITION value or percentage of displacement is computed by processor block 54 per step 109. The SENSOR POSITION value is compared to the table of BREAKPOINTS to determine which BREAKPOINT is closest to the SENSOR POSITION per step 110.

The PROXIMITY of the SENSOR POSTION value to the BREAKPOINT is calculated per step 112, as: PROXIMITY=1−Absolute of (SENSOR POSITION value−BREAKPOINT value)/(difference between BREAKPOINTS).

Next, the currently stored ESTIMATED CORRELATION VALUE for the BREAKPOINT determined in step 110 is retrieved from the memory per step 114. The corresponding ACTUAL CORRELATION ERROR, which is represented by a point on curve 113 of FIG. 5, is retrieved per step 115. For this iteration, the ACTUAL CORRELATION ERROR corresponds to the sensor signals obtained for the current SENSOR POSTION value (step 109). The initial ESTIMATED CORRELATION VALUE retrieved in step 114 is subtracted from the ACTUAL CORRELATION ERROR to determine the DIFFERENCE per step 116. For example, initial DIFFERENCE at 0% pedal displacement is approximately negative 4.5% as indicated by bracket 117 of FIG. 5.

Then, the PROXIMITY, DIFFERENCE and initial ESTIMATED CORRELATION VALUE are used to calculate a NEW ESTIMATED CORRELATION VALUE 121 of FIG. 5 per step 118 of FIG. 4. More specifically, the square of the PROXIMITY determined in step 112 is multiplied by the DIFFERENCE of step 116 and a filter coefficient. The result is then added to the ESTIMATED CORRELATION VALUE presently stored at the selected BREAKPOINT, i.e., NEW ESTIMATED CORRELATION VALUE=previous ESTIMATED CORRELATION VALUE+[PROXIMITY ^2 DIFFERENCE VALUE * filter coefficient]. The proximity value is squared to give more weighting to ESTIMATED CORRELATION VALUES that are closer to table breakpoints. The NEW ESTIMATED CORRELATION VALUES are limited to a minimum of zero. For example, the NEW ESTIMATED CORRELATION VALUE 121 corresponding to the first breakpoint 119 is then stored in the memory in place of the initial correlation value 108 of FIG. 5 in accordance with step 120. In this example, the NEW ESTIMATED CORRELATION VALUE 121 is less than the initial correlation value 108 because the DIFFERENCE value is negative for this iteration (−4.5%).

Steps 109 through 120 are repeated a predetermined or selected number of times per step 126. Concurrently, steps 94 and 96 are repeated as necessary to receive new sensor signals and to calculate the ACTUAL CORRELATION ERROR values for the new sensor signals. Assuming the accelerator is completely depressed and released, steps 109 to 120 result in graph 122 of FIG. 5 representing the resulting NEW ESTIMATED CORRELATION VALUES that are stored in the memory of BLOCK 54 in place of level 108. Hence, method 90 as thus far described provides graph 122, which more closely approximates the physical or actual correlation errors represented by graph graph 113 of FIG. 5 than does level 108.

Repeating steps 109 through 120 an additional two times provides new correlation error curves 125 and 130, etc., which even more closely approximate graph 113 than graph 122 does. Steps 109 through 120 are repeated per step 126 at the same frequency as the reading of position sensor inputs or a multiple thereof.

After a selected number of cycles or iterations through steps 109 to 120, a correlation DIFFERENCE is compared to a predetermined threshold such as 2%, in step 128. If the DIFFERENCE doesn't exceed the predetermined threshold, then steps 109 through 120 are repeated as indicated by line 131 of FIG. 4. Each time this iteration occurs, new approximation graphs are created and stored which more closely represent actual correlation error graph 113.

Alternatively, if the correlation DIFFERENCE between a selected NEW ESTIMATED CORRELATION VALUE and a corresponding ACTUAL CORRELATION ERROR exceeds the predetermined threshold in step 128 as indicated by line 132 of method 90, an error signal is generated per step 134, stored per step 136, and utilized per step 138. The DIFFERENCE data or any of the other above-described data can be stored over time and made available to a service technician who can determine whether sensor 24 or 26 is anticipated to fail and thus whether corrective action needs to be taken before an actual sensor failure occurs. By utilizing the variations of sensors 24 and 26 over time the manufacturing tolerances for the components of position sensing system 20 of FIG. 2 can be less restrictive, thus permitting a lower system cost.

In FIG. 6 time is measured along abscissa axis 200 and Correlation Percentage (%) is measured along ordinate axis 202. Assuming a constant pedal displacement of 20%, the actual correlation error is 2% as indicated by point 204 on curve 113 of FIG. 5. Thus, level 206 of FIG. 6 is near 2%. Curve 208 shows that the learned or NEW ESTIMATED CORRELATION VALUES progress from 5.00% toward 2.00% and approximate 2% at time=40 seconds as indicated by point 210. Also, curve 212 shows that as time progresses, the DIFFERENCE between the NEW ESTIMATED CORRELATION VALUES and the ACTUAL CORRELATION ERRORS becomes smaller and approaches 0% at time=40 seconds. This is because of the increasingly more accurate successive approximations of curves 122, 125 and 130 to curve 113 as shown in FIG. 5.

Noise spike 220 is shown to occur at either sensor terminal 70 or 72 at time=60 seconds. Spike 220 causes a rise 222 in the correlation DIFFERENCE 212. The magnitude of spike 222 is assumed not to be large enough to cause the DIFFERENCE to trigger the "limp home" mode. Spike 222 is the difference between the learned or NEW ESTIMATED CORRELATION VALUE curve and noise spike 220. The magnitude of spike 222 is not quite as large as the magnitude of noise spike 220 because of a first approximation. The delay provided by the successive approximations resulting from repeating steps 109 to 120 enables ETC system 34 to not immediately adapt to noise spike 220. The NEW ESTIMATED CORRELATION VALUE of 2.25% corresponding to spike 220 is indicated by point 224 on curve 208. The learned value subsequently approaches 2.00% as indicated by curve 208 at time=80 seconds, for instance. The closer the filter coefficient of step 116 of method 90 is to 1, the faster system 34 learns the new correlation error. Curve 208 corresponds to a filter coefficient of 0.5.

Method 90 can generate an error signal in response to noise spike 220 per step 134 and store the error signal per step 136. If too many noise spikes occur in a certain time period, then a service technician can be alerted to the developing potential problem caused by a failing sensor and take corrective action. Hence, the above-described apparatus and method is less sensitive to such noise or other spurious signals applied to system 34 than some prior art systems which would immediately initiate the limp home mode in response to such noise signals.

Thus, apparatus 34 and method 90 have been disclosed for improving the detection and notification of a failing position sensor 24 or 26. Apparatus 34 and method 90 enable anticipation that a sensor is failing prior to its performance degrading a predetermined amount so that corrective action can be taken before the system latches a system fault. Such latch condition would otherwise result in the previously mentioned undesirable "limp home" operation and a costly and perhaps unneeded repair. In addition, by learning and storing the variations of sensors 24 and 26 over time, the manufacturing tolerances for the position sensing system can be less restrictive thus permitting a lower system cost.

From the foregoing detailed description of preferred exemplary embodiments, it should be appreciated that apparatus and methods are provided for determining the condition of sensors 24 and 26 along with anticipating and identifying the failure thereof. While the preferred exemplary embodiments have been presented in the foregoing detailed description of the preferred exemplary embodiments, it should be appreciated that a vast number of variations exist. It should also be appreciated that these preferred exemplary embodiments are only examples, and are not intended to limit the scope, applicability, or configuration of the invention in any way. Rather, the foregoing detailed description will provide those skilled in the art with a convenient road map for implementing a preferred embodiment of the invention, it being understood that various changes may be made in the function and arrangement of elements described in an exemplary preferred embodiment without departing from the spirit and scope of the invention as set forth in the appended claims.

The invention claimed is:

1. An apparatus for generating error signals, including in combination:
   at least two sensors providing control signals having magnitudes that approximately correspond to a sensed event, said magnitudes being unequal to each other;
   memory means for storing estimated correlation values;
   processor means coupled to said sensors and to said memory means, said processor means calculating an actual correlation error for said control signals;
   said processor means further calculating a difference value based on the difference between a current estimated correlation value and said actual correlation error;
   said processor means additionally calculating a new estimated correlation value based on said difference value and said current estimated correlation value;
   said processor means comparing a difference magnitude value based on the difference between said new estimated correlation value and said actual correlation error to a threshold value; and
   said processor means providing an error signal if said difference magnitude value exceeds said threshold value.

2. The apparatus of claim 1 wherein said processor means is configured to store said new estimated correlation value in said memory means in place of said current estimated correlation value.

3. The apparatus of claim 1 wherein said current estimated correlation value is an initial estimated correlation value representing a maximum allowable correlation error value.

4. The apparatus of claim 1 wherein said processor means calculates a predetermined number of new estimated correlation values before comparing said difference magnitude value to said threshold value to thereby provide a predetermined amount of delay to enable said processor means to evaluate said difference magnitude value.

5. The apparatus of claim 1 further comprising means for using said error signal to determine if any of the sensors is failing.

6. The apparatus of claim 1 wherein:
   said magnitudes of said control signals correspond to the positions of an accelerator control device for an engine having an electronically controlled throttle; and
   each of said magnitudes further corresponding to a desired amount of airflow through said electronically controlled throttle.

7. The apparatus of claim 6 wherein:
   said at least two sensors each have a movable member whose positions correspond to said positions of said accelerator control device;
   said magnitudes of said control signals varying with said positions of said movable members; and
   said memory means being configured to have predetermined breakpoints corresponding to said magnitudes of said control signals and to store initial estimated correlation values at said predetermined breakpoints.

8. The apparatus of claim 7 wherein at least one of said sensors include a potentiometer having said movable member.

9. The apparatus of claim 7 wherein said processor means compares a sensor position value to the predetermined breakpoints to determine which breakpoint is closest to the sensor position value.

10. The apparatus of claim 7 wherein said processor means determines a proximity value representing a proximity of a position of said movable member to said corresponding breakpoint.

11. The apparatus of claim 10 wherein said processor means calculates said difference value by utilizing said proximity value.

12. The method of claim 11 wherein said processor means squares said proximity value to give more weighting to correlation errors that are closer to said breakpoints.

13. A method for determining a condition of at least one of a plurality of sensors and for generating error signals in response to sensor failure, the method comprising:
   receiving input signals from at least two of the sensors, said input signals having different magnitudes that approximately correspond to a sensed event;
   calculating an actual correlation error relating to said different magnitudes of said input signals;
   storing a current estimated conelation value;
   determining a difference value between said actual correlation error and said current estimated correlation value;
   using said difference value to calculate a new estimated correlation value;
   storing said new estimated correlation value in place of said current estimated correlation value;
   repeating said determining, using and storing steps to calculate a predetermined number of updated new estimated correlation values; and
   determining a current difference magnitude value based on the difference between a currently updated new estimated correlation value and said actual correlation error, determining that said current difference magnitude value exceeds a predetermined threshold, and generating an error signal in response to the determination that said current difference magnitude value exceeds said predetermined threshold.

14. The method of claim 13 further comprising using said error signal to determine if a sensor is failing.

15. The method of claim 13 wherein said current estimated correlation value is an initial estimated correlation value representing a maximum allowable correlation error value.

16. The method of claim 13 wherein said repeating said steps enables the method to provide a predetermined amount of delay enabling evaluation of said current difference magnitude value.

17. The method of claim 13 wherein said sensors have a movable member having positions corresponding to the sensed event and further comprising:
  reserving memory locations for a table of breakpoints corresponding to said movable member positions; and
  reserving memory locations for a table of estimated correlation errors corresponding to said movable member position breakpoints.

18. The method of claim 17 wherein:
  said sensed event is the position of an accelerator control device for an engine; and
  said method being further comprised of mechanically coupling said movable members to said accelerator control device.

* * * * *